United States Patent
Heighway

(10) Patent No.: US 8,002,687 B2
(45) Date of Patent: Aug. 23, 2011

(54) METHOD OF REINFORCING A ROLLER CLADDING MATERIAL AND CLAD LEHR ROLLER

(75) Inventor: Dale Heighway, Bretteville L'Orgueilleuse (FR)

(73) Assignee: Pilkington Group Limited, St. Helens, Merseyside (GB)

( * ) Notice: Subject to any disclaimer, the term of this patent is extended or adjusted under 35 U.S.C. 154(b) by 67 days.

(21) Appl. No.: 12/085,740

(22) PCT Filed: Dec. 6, 2006

(86) PCT No.: PCT/GB2006/050431
§ 371 (c)(1),
(2), (4) Date: May 11, 2009

(87) PCT Pub. No.: WO2007/066145
PCT Pub. Date: Jun. 14, 2007

(65) Prior Publication Data
US 2009/0293547 A1 Dec. 3, 2009

(30) Foreign Application Priority Data

Dec. 10, 2005 (GB) .................................. 0525275.4

(51) Int. Cl.
*F16C 13/00* (2006.01)
(52) U.S. Cl. ................ 492/49; 492/40; 492/41; 492/53; 65/253; 65/374.1
(58) Field of Classification Search ............ 65/148–151, 65/253–257, 370.1, 374.1–374.15; 492/16–17, 492/38, 49–52
See application file for complete search history.

(56) References Cited

U.S. PATENT DOCUMENTS 3,549,485 A  12/1970  Eckert
3,763,533 A  10/1973  Blom et al.
(Continued)

FOREIGN PATENT DOCUMENTS

EP   0 135 336 A2   3/1985
(Continued)

OTHER PUBLICATIONS

Burnie, Janice, Dr.; Challand, Nigel; Pilkington Controlled Release Systems Limited; Cordis: a technology for today and tomorrow; Foundry Trade Journal; Binder Technology; Jun. 7, 1991; p. 396; United Kingdom.

*Primary Examiner* — Matthew J Daniels
*Assistant Examiner* — Jodi Cohen
(74) *Attorney, Agent, or Firm* — Marshall & Melhorn, LLC

(57) ABSTRACT

Methods of reinforcing a fibrous roller cladding material, reinforced roller cladding materials and clad lehr rollers wherein the cladding comprises a reinforced fibrous material are disclosed. The roller cladding material, which comprises a fiber board, is reinforced by a method comprising firstly contacting the cladding material with a fluid medium comprising a reinforcing agent whereby fluid is absorbed by the cladding material, and secondly, drying the cladding until the surface of the cladding is dry to the touch, characterized in that the reinforcing agent comprises a compound of phosphorus or a compound of boron. Roller cladding materials reinforced according to the methods disclosed have an improved resistance to cullet damage. The reinforced roller cladding material may be used as the cladding of a clad lehr roller, of the type used for example to convey flat glass in sheet or ribbon form.

23 Claims, 3 Drawing Sheets

U.S. PATENT DOCUMENTS

| | | | |
|---|---|---|---|
| 3,853,525 A * | 12/1974 | Gorman | 65/181 |
| 4,216,005 A | 8/1980 | Gladieux et al. | |
| 4,244,781 A | 1/1981 | Heckman | |
| 4,352,230 A * | 10/1982 | Sukenik | 492/40 |
| 5,205,398 A | 4/1993 | Hart et al. | |
| 5,355,996 A | 10/1994 | Hart | |
| 5,378,219 A | 1/1995 | Hart et al. | |
| 5,573,055 A | 11/1996 | Melling et al. | |
| 5,709,639 A | 1/1998 | Hart et al. | |
| 5,989,170 A | 11/1999 | Hart et al. | |
| 6,299,677 B1 | 10/2001 | Johnson et al. | |

FOREIGN PATENT DOCUMENTS

| | | |
|---|---|---|
| EP | 0 473 926 A2 | 3/1992 |
| EP | 0 736 500 A2 | 10/1996 |
| EP | 0 553 231 B1 | 7/1998 |
| GB | 984 072 A | 2/1965 |
| GB | 1 382 443 A | 1/1975 |
| GB | 2 031 043 A | 4/1980 |
| GB | 2 067 728 A | 7/1981 |
| GB | 2 254 346 A | 10/1992 |
| GB | 2 294 309 A | 4/1996 |
| JP | 63-111118 A | 5/1988 |
| JP | 1033042 A | 2/1989 |
| JP | 1061371 A | 3/1989 |
| JP | 1065037 A | 3/1989 |
| JP | 9048628 A | 2/1997 |
| JP | 2000 095536 A | 4/2000 |
| WO | WO 97/49646 A1 | 12/1997 |
| WO | WO 03/011778 A2 | 2/2003 |
| WO | WO 2005/042433 A1 | 5/2005 |

* cited by examiner

METHOD OF REINFORCING A ROLLER CLADDING MATERIAL AND CLAD LEHR ROLLER

BACKGROUND OF THE INVENTION

This invention relates to methods of reinforcing a fibrous roller cladding material, to reinforced roller cladding and to clad lehr rollers wherein the cladding comprises reinforced fibrous material.

When flat glass is produced continuously, for example by a float or rolled process, a continuous ribbon of glass is formed that is annealed to remove stresses before being cut into sheets. The ribbon of hot glass is typically conveyed on a roller bed through a lehr where the glass passes through different temperature zones to anneal and cool the glass. Rollers made of different materials are used in different parts of the roller bed. Clad lehr rollers are commonly used in those areas of the lehr where the temperature is in the range 200° C. to 700° C.; more usually where the temperature is in the range 200° C. to 550° C. A clad lehr roller comprises a central shaft often made from steel with an outer cladding of a material having a low thermal conductivity which is sufficiently robust to withstand the high temperatures and which will not mark the surface of the glass. Over recent years millboard has replaced asbestos board as the cladding material of choice. Millboard is a monolithic fibre board made of ceramic or mineral fibres, inert fillers and small amounts of organic binders. Typically a clad lehr roller comprises a cladding formed from a plurality of millboard disks, each disk having a hole punched in the centre and all the disks being mounted on a shaft and held under lateral compression. Alternatively the cladding could comprise a number of hollow cylinders or a single hollow cylinder mounted upon the shaft.

A problem with millboard is that it is not as resistant to abrasion as asbestos and consequently clad lehr rollers comprising a millboard cladding are more vulnerable to cullet damage and to cullet becoming embedded in the cladding. The term cullet used herein refers to broken flat glass. Cullet damage can occur when the clad roller rotates and cullet in contact with the surface of the cladding gouges out channels in that surface thereby reducing the useful life of the roller. Cullet damage also releases millboard particles into the atmosphere which may settle on the glass surface and reduce its quality. In addition, pieces of cullet can become embedded in the cladding and mark the surface of glass thereby reducing the quality of the glass. Replacing a damaged roller increases maintenance costs and can disrupt the glass manufacturing process. There is a need for a clad lehr roller which is less susceptible to damage and thereby has a longer useful life.

U.S. Pat. No. 3,763,533 discloses processes in which mineral fibres such as kaolin wool, glass wool, rockwool and slag wool were bound using a liquid binder such as colloidal silicic acid or solutions of silicates and phosphates such as monoaluminium phosphate to form a roller cladding material. Strips of fibre were felt wound around a roller core, impregnated with a binder and heated until dry. Such rollers have proven not to be sufficiently acceptable to find wide use in replacing asbestos rollers.

U.S. Pat. No. 5,378,219 describes a roller cladding material in the form of a compressed fibre roll cover which may comprise a binder such as colloidal silica or colloidal alumina. The fibre roll may be impregnated with a suspension of the binder and dried.

U.S. Pat. No. 4,216,005 disclosed asbestos rolls for use in the conveying of heated glass that have been chemically treated with an aqueous solution of potassium sulphate. The material with which the roll is treated permeates the asbestos and crystallises upon drying, and the crystals serve to bind the asbestos particles together to form a cohesive mass.

JP 09048628A discloses rollers for transporting flat glass. The rollers have a cladding made from discs of inorganic fibres which have been dipped in an aqueous solution of saturated potassium sulphate at greater than 50° C. for less than 1 hour under a reduced or pressurised state to penetrate potassium sulphate into an outer peripheral part of the disc. The discs are subsequently removed from the solution and dried.

Applicants have discovered that a clad roller having an extended useful lifetime may be produced by contacting a surface of the cladding with a fluid medium comprising a reinforcing agent and drying the material to produce a roller with a harder surface.

BRIEF SUMMARY OF THE INVENTION

Accordingly from a first aspect the present invention provides a method of reinforcing a roller cladding material comprising a fibre board, the method comprising the steps of (a) first contacting the cladding with a fluid medium comprising a reinforcing agent whereby the fluid is absorbed by the cladding and (b) second drying the cladding until the surface of the cladding material is dry to the touch, characterised in that the reinforcing agent comprises a compound of phosphorus or a compound of boron.

Preferably the cladding is formed from a millboard.

The reinforcing agent is selected so that surface of the cladding after the drying step is harder than that of the untreated cladding. The reinforced cladding should be resistant to deformation and degradation by high temperatures. Preferably the reinforcing agent and the cladding material will have a similar thermal expansion coefficient so the integrity of the reinforced cladding is maintained as a function of temperature. For applications related to float glass manufacture, the cladding material should be thermally and chemically stable at temperatures between 150° C. and 700° C. Preferably the reinforced cladding should be non-marking to glass and have low affinity for sodium sulphate and dross deposits.

Preferably the fluid medium is an aqueous solution.

In one preferred embodiment the reinforcing agent comprises a metal phosphate or a metal borate, more preferably an alkali metal phosphate or borate. Most preferably the reinforcing agent comprises a sodium phosphate or a sodium borate.

In a second preferred embodiment the reinforcing agent comprises a water-soluble phosphate glass or a water-soluble borate glass, in which case the solution can be made by dissolving powdered metal phosphate glass or powdered metal borate glass in water.

The preferred phosphate glasses are those comprising from 30 to 80 mol % $P_2O_5$, from 20 to 70 mol % $R_2O$, from 0 to 30% MO and from 0 to 15 mol % $L_2O_3$, where R is Na, K or Li, M is Ca or Mg or Zn and L is Al or Fe. Preferably the water soluble phosphate glass is a glass wherein R is Na and the glass comprises $Na_2O$ and $P_2O_5$ in substantially equimolar proportions. Preferably the water-soluble phosphate glass comprises polyphosphate chains. The preferred borate glasses are those comprising from 30 to 80 mol % $B_2O_3$, from 20 to 70 mol % $R'_2O$, from 0 to 30% M'O and from 0 to 15 mol % $L'_2O_3$, where R' is Na, K or Li, M' is Ca or Mg or Zn and L' is Al or Fe. Preferably the water soluble borate glass is a glass wherein R' is Na and the glass comprises $Na_2O$ and $B_2O_3$ in substantially equimolar proportions.

Preferably the solution comprises a weight ratio of phosphate glass or borate glass:water of between 1:0.5 and 1:2.5.

The solution acts as a vehicle to incorporate the reinforcing agent into the cladding. Drying the cladding removes solvent by evaporation. When the fibrous cladding is dry to the touch the reinforcing agent should preferably form a substantially continuous matrix which extends over the surface of the fibrous material.

The duration of the contact between the cladding material and the fluid medium in the first step of the method should be sufficient to absorb enough solution to reinforce the cladding material. The porosity of the cladding material will also affect the rate of absorption and the degree of absorption of the fluid into the cladding material which in turns affects the continuity of the matrix of reinforcing agent and the consequent improvement in the strength of the surface. In a preferred embodiment the contact between the fluid comprising the reinforcing agent and the cladding material is terminated before the cladding becomes saturated with the fluid. In a more preferred embodiment only the exterior surface of the cladding material is brought into contact with the fluid. As a consequence, when the cladding material is dried there is a concentration gradient of the reinforcing agent within the body of the cladding. The physical properties of the areas of the cladding material into which relatively little or no fluid has been absorbed are relatively unchanged. Typically the duration of the first step is less than 10 hours, preferably between 2 and 6 hours.

This first step can comprise one or more of the following methods of contacting the cladding material with the fluid medium, namely immersing a surface of the cladding in the fluid, spraying a surface of the cladding with the fluid or injecting the fluid into the cladding. Preferably the first step comprises immersing a surface of the cladding in a solution.

The cladding is preferably prefabricated in the form of a hollow disk or cylinder suitable for mounting upon a roller shaft to form a clad roller. The exterior surface is brought into contact with the solution of a reinforcing agent whilst the solution is excluded from contact with the interior surface and preferably also from the end faces of the disks or cylinders. Preferably this is achieved by mounting the disks or cylinders on a shaft and bringing the exterior surface into contact with the solution.

Only part of the cladding need be immersed in the solution at any one time provided that it is rotated in a manner such that the other parts come into contact with the solution. The rate of rotation should be sufficiently fast to prevent any part of the surface of the cladding which is not in contact with the solution from drying and restricting further absorption of the solution. The first step of the process may be carried out under a controlled atmosphere.

At the beginning of the drying step the cladding is removed from contact with the solution. The second step may be carried out under a controlled atmosphere but preferably it is carried out in the air.

The duration of the second step should be at least long enough that the surface of the cladding is dry to the touch at the end of it. The cladding need not be totally dry. The duration of the second step will depend on the duration of the first step and the dimensions of the cladding. If more solution has been absorbed by the cladding it will take longer to dry. Preferably the duration of the second step is less than 100 hours, more preferably less than 70 hours.

The temperature of the cladding and the temperature of the atmosphere in the vicinity of the surface of the cladding can influence the rate of drying during the second step. By increasing the temperature of the atmosphere in the vicinity of the surface above ambient, the rate of drying may be increased. Preferably during the second step the temperature of the atmosphere in the vicinity of the surface of the fibrous material does not exceed 600° C. and is preferably between ambient and 200° C. above the boiling point of the solution. As the drying step begins, any excess solution may drip from the cladding. As the fibrous material dries, there is a tendency for solution in the body of the cladding to flow to the lowest point. In order to avoid this tendency the cladding may be rotated during the second step of the process.

When the surface of the cladding is dry to the touch the reinforcing agent preferably forms a substantially continuous matrix which extends over the surface of the fibrous material.

In a preferred embodiment the second step comprises two stages. During the first stage the temperature of the atmosphere in the vicinity of the surface of the cladding is preferably between ambient and 50° C. During this first stage free solvent can be lost from the cladding by evaporation. During the second stage the temperature of the atmosphere in the vicinity of the fibrous material surface is increased preferably to a value which is up to 200° C. higher than the temperature in the first stage. It is advantageous to begin the second stage as soon as possible after the end of the first stage Either stage can be carried out in an atmosphere to modify the manner in which the fibrous material dries and the subsequent strength improvement of the reinforced cladding. Preferably the first and second stages are carried out in air.

When the second step comprises two stages the duration of the two stages need not be the same. Preferably the duration of the second stage is less than 60 hours, more preferably less than 40 hours.

In the preferred embodiments the cladding is supported on a shaft during the first step of the process and the duration of the first step is limited so that the solution does not penetrate the entire thickness of the cladding. When dried, the cladding will have a concentration gradient of reinforcing agent in the cladding material ranging from being relatively or in the more preferred embodiments substantially free of reinforcing agent in the area adjacent to the shaft with an increase in the concentration of reinforcing agent at the exterior of the cladding. This reinforces the surface of the clad roller and leaves the properties of the cladding adjacent to the shaft relatively unchanged. As a result the cladding is better able to accommodate any increase in dimensions of the shaft when the roller is introduced into the lehr which prolongs the useful life of the roller.

Reinforced millboard roller cladding materials wherein one surface is harder than the other are believed to be novel and comprise a second aspect of the present invention. In a preferred embodiment where one surface has been reinforced using a soluble reinforcing agent there is a concentration gradient of reinforcing agent between the one surface and an opposed surface. More preferably the concentration of reinforcing agent at the opposed surface is substantially zero. The reinforcing agent preferably penetrates through at least 10%, more preferably at least 25%, and most preferably at least 50% of the thickness of the cladding material.

The reinforced clad roller can be located in a lehr after the first stage or after the second stage of the drying step. The elevated temperature in the lehr will complete the drying process.

The reinforced cladding can be inspected following either the first or second stage of the second step and any surface protrusions removed by suitable means such as abrasion.

BRIEF DESCRIPTION OF THE DRAWINGS

Embodiments of the present invention will now be described by way of example only with reference to the accompanying drawings in which.

DETAILED DESCRIPTION OF THE INVENTION

A standard millboard clad lehr roller with an overall diameter of about 200 mm was reinforced. The cladding was MB800 millboard and had a thickness of about 50 mm. The solution used to reinforce the millboard contained water and a water-soluble sodium phosphate glass and was sold under the trade mark CORDIS. CORDIS is now known as Binder B solution. CORDIS solutions are described in EP 0 553 231 B1.

A sample of the CORDIS solution was examined by Thermogravimetric Analysis (TGA) where two distinct weight losses occurred at derivative peak temperatures of 244° C. and 391° C. amounting to 5.9% and 7.1% respectively. The total residue was almost 87%. Examination of the residue using X-Ray fluorescence gave the semi-quantitative analysis shown in Table One.

TABLE ONE

| | Elements Detected |
|---|---|
| Over 10% | P, Na |
| 1-10% | None |
| 0.1-1% | Si, Al, Ca, Fe |
| Trace | K |

A sample of Binder B solution was heated in air at 110° C. and the weight loss measured. The sample was heated at this temperature until no further weight loss was observed. The weight of the solution decreased by 41.5%. The sample was then further heated at 300° C. and the weight loss measured. The sample was again heated for long enough so that no further weight loss was measured. This produced a further weight loss of 15.5%. This indicates that the original solution contained 57 percent by weight water and 43 percent by weight dissolved solids. The weight ratio of water to dissolved solids was therefore 1:1.3. The residue that remained was analysed by X-ray fluorescence and had a composition in terms of weight percent of $30.5Na_2O:69.5P_2O_5$. In terms of mole percent the residue had a composition of $50.1Na_2O:49.9P_2O_5$.

Example 1

Figure 1:
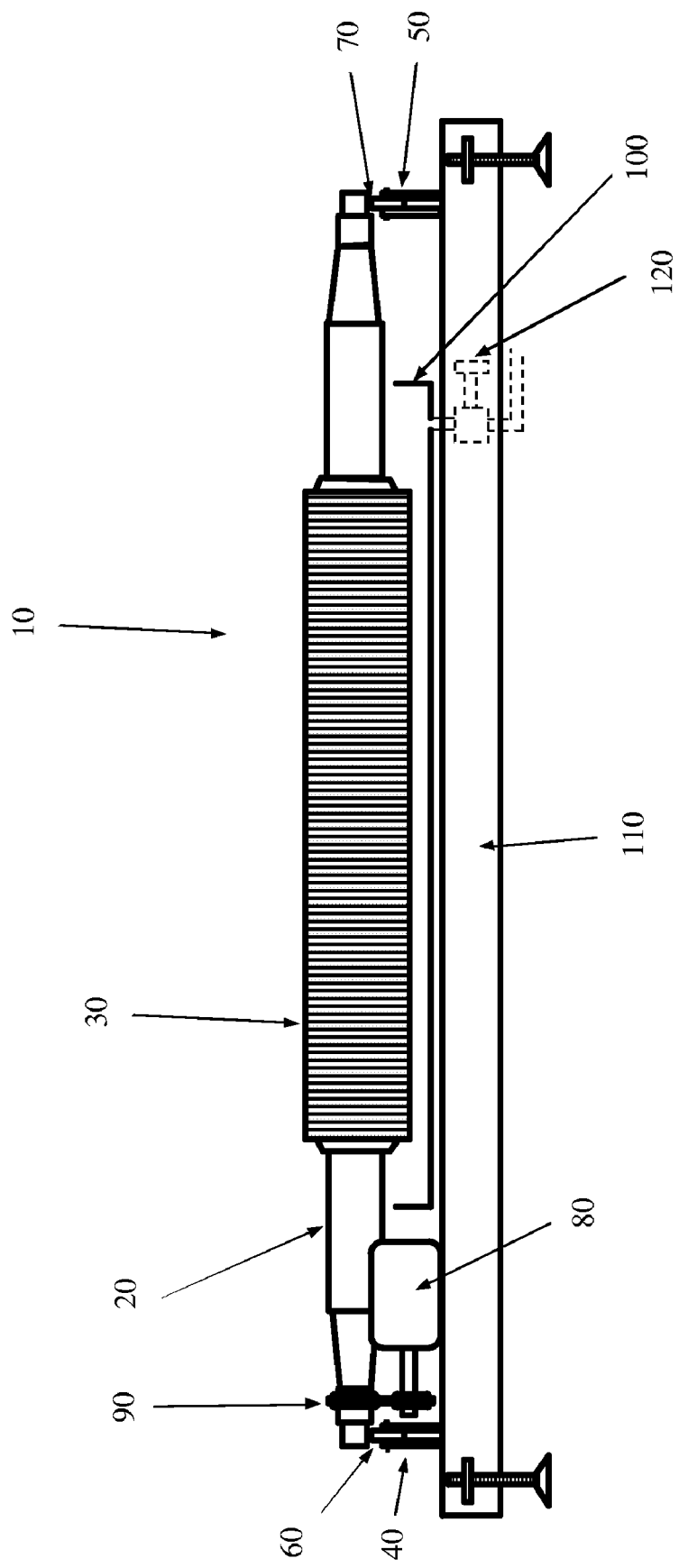
FIG. 1 shows a millboard clad lehr roller (not to scale) located in a bath prior to contacting the cladding with a solution comprising a soluble reinforcing agent.

The following method was used to reinforce the millboard cladding whilst it was located on the clad lehr roller and is illustrated in FIG. 1. The millboard clad lehr roller (10) consisted of a central steel shaft (20) clad with MB800 millboard (30) in the form of a number of disks located along the shaft. The roller was suspended at each end by support stands (40) and (50). A roller bearing (60) and (70) was fitted to each support stand to allow the roller to be rotated by motor (80) coupled to one end of the roller by drive chain (90). Other methods of rotating the roller could be used, for example by a direct drive. The clad lehr roller was suspended inside bath (100). The bath and support stands were mounted on a levelling frame (110).

The CORDIS solution was poured into bath (100) and was absorbed into the millboard cladding. The clad lehr roller (10) was slowly rotated whilst the CORDIS solution was poured into bath (100) until the lower surface of the millboard cladding was completely immersed. The atmosphere above the solution was air. The millboard cladding was left in contact with the solution for 4 hours, during which time the roller was left slowly rotating. At the end of this step the CORDIS solution was drained from the bath (100) by opening tap (120) so that the millboard cladding was no longer in contact with the solution, other than that which was already absorbed.

The drying step began when the millboard cladding was no longer in contact with the solution in the bath. The roller was left rotating slowly for about 16 hours to air-dry at ambient temperature after which time the roller surface was dry to the touch and had an even matt appearance. If the roller was not rotated as the millboard cladding dried the solution would eventually sink to the lowest part of the millboard cladding and the upper surface of the millboard cladding would show signs of separation.

The clad lehr roller was transferred without delay to a kiln of a rectangular construction with dry-built firebrick walls and base and insulation boards forming the roof. The kiln was fired from one end by a standard space heater running on propane. The clad lehr roller was supported horizontally in the kiln and the space heater switched on so that the temperature of the kiln atmosphere reached 120° C. over a period of 2 hours. The temperature of the roller core was about 60° C. at this stage. Next, the temperature of the kiln atmosphere was increased rapidly to 170° C. whereby the roller core reached about 135° C. The kiln atmosphere was maintained at this temperature for about 4 hours during which the roller was rotated occasionally through 180° to ensure uniform heating. The roller could be continually rotated whilst in the kiln using motor (80) or other means. Next the space heater was turned down so that the temperature of the kiln atmosphere dropped to about 130° C. whereby the roller core temperature dropped to about 75° C. The roller was left at this temperature for about 12 hours after which the time the space heater was turned off, the kiln roof removed and the roller allowed to cool to ambient. When the roller had cooled to ambient any surface lumps were removed by lightly rubbing with emery paper. The reinforced millboard cladding had a glazed appearance and was dry to the touch. The reinforcing agent had penetrated about 25 mm into the 50 mm thick millboard cladding.

Figure 2:
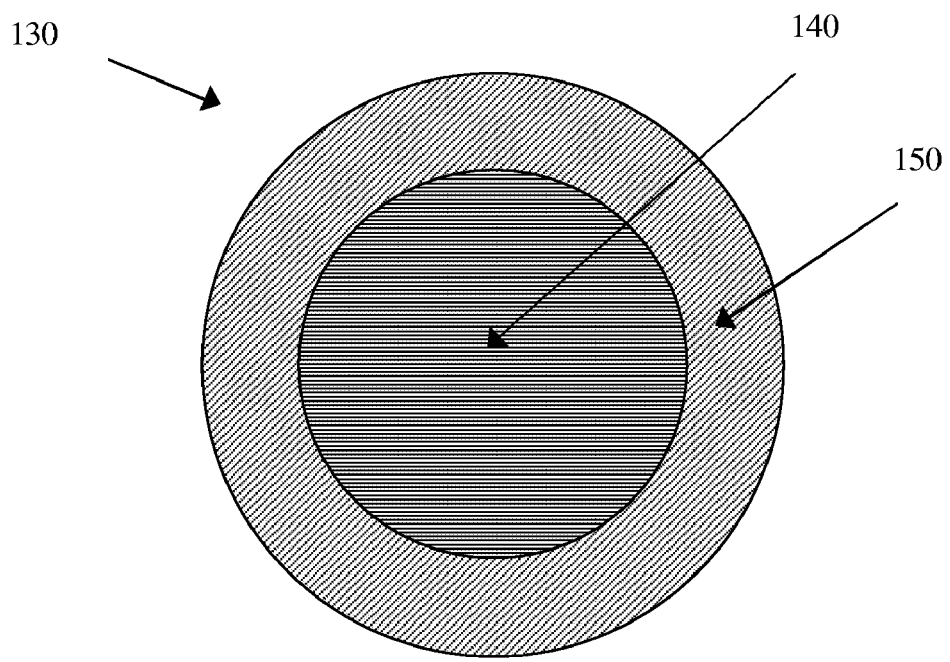
FIG. 2 shows a cross section (not to scale) of a conventional millboard clad lehr roller.
Figure 3:
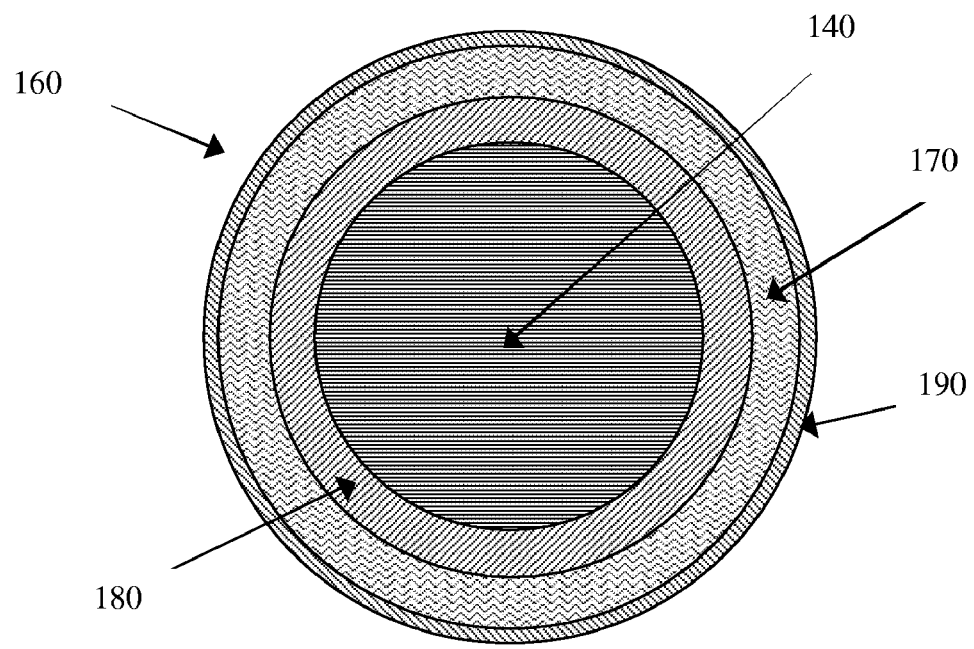
FIG. 3 shows a cross section (not to scale) of a reinforced millboard clad lehr roller according to this invention.

A conventional clad lehr roller (130) is shown in FIG. 2 and comprises a central steel shaft (140) and an outer MB800 millboard cladding (150) formed from a number of disks of the millboard. A reinforced millboard clad lehr roller (160) is shown in FIG. 3. In this example the reinforcing agent has penetrated about half way into the millboard cladding to produce a portion of the millboard that was reinforced (170). Adjacent to the shaft (140) the millboard contained no reinforcing agent. There was not an abrupt boundary between the untreated millboard (180) and the reinforced millboard (170). There is a concentration gradient of reinforcing agent in the millboard cladding, extending from a maximum near the roller surface to no reinforcing agent near the steel shaft (140). A hard coating (190) of dried CORDIS solution was adhered to the millboard surface and was on average less than a millimeter thick.

Reinforced millboard clad lehr rollers were produced according to the above method and used to replace standard MB800 millboard clad lehr rollers in the roller bed of annealing lehrs of different float glass making lines.

Example 2

A reinforced millboard clad lehr roller with a diameter of 200 mm was used in a roller bed on a float line annealing lehr where the temperature was about 300° C. After 7 years use this roller looked in good condition and appeared to have resisted abrasion far better than standard MB800 millboard clad lehr rollers.

Example 3

A reinforced millboard clad lehr roller of diameter 203 mm was used in a roller bed on a different float line annealing lehr to Example 1. This reinforced roller was used in the C-zone where the temperature was about 400° C. After 10 years use the roller looked in good condition. This roller outlasted several standard MB800 clad lehr rollers used in a similar position. Clad lehr rollers used in this area are particularly prone to cullet damage and typically show severe wear after 3 years.

Example 4

A reinforced millboard clad lehr roller was used in a roller bed on the same float line annealing lehr as in Example 2. This reinforced roller was used in the C-zone where the temperature was about 300° C. A standard MB800 clad lehr in a similar position installed at the same time showed significant cullet damage after one year of use whilst the roller with the reinforced millboard cladding showed no signs of abrasion.

Example 5

A reinforced millboard clad lehr roller of diameter 330 mm was used in a roller bed in an annealing lehr on a different float line to the other examples. The reinforced roller was used in a position where the temperature was about 300° C. After 10 years use this roller showed no signs of cullet damage.

Example 6

Figure 4:
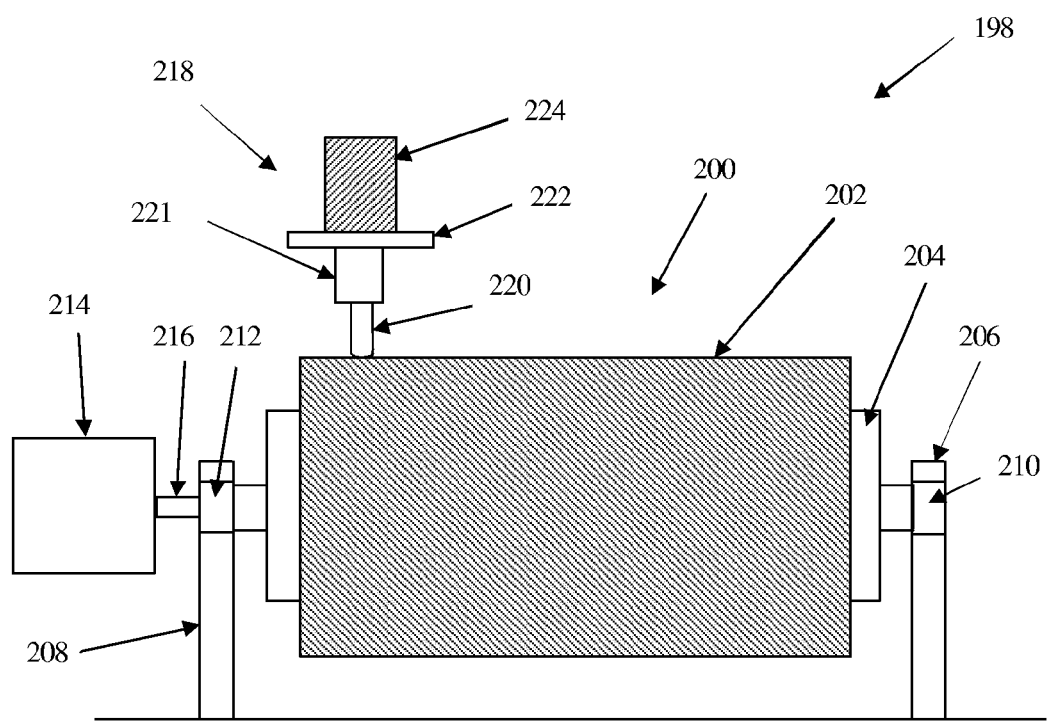
FIG. 4 shows a schematic of an apparatus used to assess on a comparative basis how a millboard clad lehr roller reinforced according to a first aspect of the invention has an improved resistance to cullet damage.

An apparatus (198) was constructed as shown in FIG. 4 to assess on a comparative basis how a millboard clad lehr roller reinforced according to the first aspect of the invention has an improved resistance to cullet damage.

A section of a conventional millboard clad lehr roller (200) about 50 cm long and about 20 cm outer diameter was mounted between uprights (206) and (208). The roller section (200) had a MB800 cladding (202) and a steel shaft (204). The roller section (200) was able to rotate about bearings (210) and (212). A motor (214) was used to rotate the roller section via a rotor (216) in mechanical communication with the roller shaft. To assess the resistance to cullet damage, an abrasion tool assembly (218) comprising an abrasion tool (220), a load table (222) to support a weight (224) was used. The abrasion tool was a vitrified alumina rod of diameter about 5 mm with one end formed to a 35° conical point. The other end of the tool was mounted in the tool housing (221), which was connected to the load table (222).

At the beginning of a test, the rounded end of the tool was placed on the cladding surface and a weight placed on the load table. The roller was then rotated at a constant rotational velocity using the motor and was left rotating at this velocity for a fixed period of time, Trs. After the time Trs had expired, the motor was stopped and the depth of the groove in the cladding caused by the weight acting on the abrasion tool was measured. The test was repeated.

The following were found to be suitable test conditions. The roller was rotated at a velocity such that a point on the cladding surface would travel 700 m in an hour, which equates to just over 1100 revolutions of the roller per hour. The weight used was 2 kg and each test was carried out for a period Trs of 8 hours.

Using the aforementioned test conditions, an untreated millboard clad lehr roller section and a millboard clad lehr roller section reinforced using the method described in example 1 were compared. It was found that for the untreated roller, the depth of the groove in the cladding caused by the abrasion tool was 5 times deeper than the depth of the groove for the reinforced cladding, under the same test conditions. The depth of the groove on the reinforced cladding was about 1 mm.

It is to be understood that the reinforced cladding material can be used as a cladding on a roller that does not convey flat glass but instead is used to convey other hot materials such as ceramics, glass containers and metals.

The invention claimed is:

1. A method of reinforcing a roller cladding material comprising a fibre board, the method comprising the steps of
   a) first contacting the cladding material with a fluid medium comprising a reinforcing agent whereby fluid is absorbed by the cladding material and
   b) second drying the cladding until the surface of the cladding is dry to the touch wherein the reinforcing agent is selected from the group consisting of a water soluble phosphate glass comprising from 30 to 80 mol % $P_2O_5$, from 20 to 70 mol % $R_2O$, from 0 to 30% MO and from 0 to 15 mol % $L_2O_3$, where R is Na, K or Li, M is Ca or Mg or Zn and L is Al or Fe and a water soluble borate glass comprising from 30 to 80 mol % $B_2O_3$, from 20 to 70 mol % $R'_2O$, from 0 to 30% M'O and from 0 to 15 mol % $L'_2O_3$, where R' is Na, K or Li, M' is Ca or Mg or Zn and L' is Al or Fe.

2. The method of reinforcing a cladding material according claim 1, wherein the reinforcing agent is a phosphate glass comprising from 30 to 80 mol % $P_2O_5$, from 20 to 70 mol % $R_2O$, from 0 to 30% MO and from 0 to 15 mol % $L_2O_3$, where R is Na, K or Li, M is Ca or Mg or Zn and L is Al or Fe.

3. The method of reinforcing a cladding material according to claim 2, wherein the R is Na and the glass comprises $Na_2O$ and $P_2O_5$ in substantially equimolar proportions.

4. The method of reinforcing a cladding material according to claim 2, wherein the solution comprises a weight ratio of glass:water of between 1:0.5 and 1:2.5.

5. The method of reinforcing a cladding material according to claim 1, wherein the reinforcing agent is a borate glass comprising from 30 to 80 mol % $B_2O_3$, from 20 to 70 mol % $R'_2O$, from 0 to 30% M'O and from 0 to 15 mol % $L'_2O_3$, where R' is Na, K or Li, M' is Ca or Mg or Zn and L' is Al or Fe.

6. The method of reinforcing a cladding material according to claim 5, wherein R' is Na and the glass comprises $Na_2O$ and $B_2O_3$ in substantially equimolar proportions.

7. The method of reinforcing a cladding material according to claim 1, wherein the duration of the first step is less than 10 hours.

8. The method of reinforcing a cladding material according to claim 1, wherein the cladding material is rotated about its longitudinal axis during the first step so that the whole of its external circumference comes into contact with the fluid medium.

9. The method of reinforcing a cladding material according to claim 1, wherein the duration of the second step is less than 100 hours.

10. The method of reinforcing a cladding material according to claim 1, wherein during the second step the temperature of the atmosphere in the vicinity of the surface of the cladding material does not exceed 600° C.

11. The method of reinforcing a cladding material according to claim 1, wherein the cladding material is rotated about its longitudinal axis during the second step.

12. The method of reinforcing a cladding material according to claim 1, wherein the second step comprises two stages.

13. The method of reinforcing a cladding material according to claim 12, wherein during the first stage the temperature of the atmosphere in the vicinity of the cladding material surface is between ambient and 50° C. higher than the boiling point of the solution.

14. The method of reinforcing a cladding material according to claim 12, wherein during the second stage the temperature of the atmosphere in the vicinity of the cladding material surface is up to 200° C. higher than the temperature in the first stage.

15. The method of reinforcing a cladding material according to claim 12, wherein the duration of the second stage is less than 60 hours.

16. The method of reinforcing a cladding material according to claim 1, wherein the cladding material is located on a shaft during the first step and/or the second step.

17. The method of reinforcing a cladding material according to claim 1, wherein the cladding material is held under compression.

18. The method of reinforcing a cladding material according to claim 1, wherein the duration of the first step is between 2 and 6 hours.

19. The method of reinforcing a cladding material according to claim 1, wherein during the second step the temperature of the atmosphere in the vicinity of the surface of the cladding material is between ambient and 200° C. above the boiling point of the solution.

20. A reinforced millboard roller cladding material wherein the exterior surface of the cladding is harder than the interior surface, wherein the reinforcing agent is selected from the group consisting of a water soluble phosphate glass comprising from 30 to 80 mol % $P_2O_5$, from 20 to 70 mol % $R_2O$, from 0 to 30% MO and from 0 to 15 mol % $L_2O_3$, where R is Na, K or Li, M is Ca or Mg or Zn and L is Al or Fe and a water soluble borate glass comprising from 30 to 80 mol % $B_2O_3$, from 20 to 70 mol % $R'_2O$, from 0 to 30% M'O and from 0 to 15 mol % $L'_2O_3$, where R' is Na, K or Li, M' is Ca or Mg or Zn and L' is Al or Fe.

21. The material according to claim 20, wherein there is a concentration gradient of the reinforcing agent between the exterior surface and the interior surface.

22. A clad lehr roller comprising a millboard cladding mounted upon a shaft wherein the exterior surface of the cladding is harder than the interior surface, there being a concentration gradient of a soluble reinforcing agent between the exterior and the interior of the cladding, wherein the reinforcing agent is selected from the group consisting of a wherein the reinforcing agent is selected from the group consisting of a water soluble phosphate glass comprising from 30 to 80 mol % $P_2O_5$, from 20 to 70 mol % $R_2O$, from 0 to 30% MO and from 0 to 15 mol % $L_2O_3$, where R is Na, K or Li, M is Ca or Mg or Zn and L is Al or Fe and a water soluble borate glass comprising from 30 to 80 mol % $B_2O_3$, from 20 to 70 mol % $R'_2O$, from 0 to 30% M'O and from 0 to 15 mol % $L'_2O_3$, where R' is Na, K or Li, M' is Ca or Mg or Zn and L' is Al or Fe.

23. The roller according to claim 22, wherein the concentration of reinforcing agent at the interior surface is substantially zero.

* * * * *